United States Patent [19]

Reid

[11] Patent Number: 5,653,878
[45] Date of Patent: Aug. 5, 1997

[54] SINGLE ORIFICE BOTTLE WATER FILTER

[75] Inventor: Henry Charles Reid, Safety Harbor, Fla.

[73] Assignee: Innova Pure Water Inc., Clearwater, Fla.

[21] Appl. No.: 452,437

[22] Filed: May 26, 1995

[51] Int. Cl.⁶ .................... B01D 15/00; B01D 24/02; B01D 69/06; C02F 1/00

[52] U.S. Cl. .................. 210/266; 210/282; 210/472; 210/474

[58] Field of Search ..................... 210/266, 282, 210/472, 474

[56] References Cited

U.S. PATENT DOCUMENTS

| | | | |
|---|---|---|---|
| 98,343 | 12/1869 | Boyce | 210/472 |
| 647,580 | 4/1900 | Parker | 210/472 |
| 690,457 | 1/1902 | Parker | 210/472 |
| 707,873 | 8/1902 | Spencer | 210/472 |
| 1,292,737 | 1/1919 | Endreson | 210/472 |
| 2,055,096 | 9/1936 | Dehn et al. | 210/472 |
| 2,212,318 | 8/1940 | Gee | 210/282 |
| 2,222,123 | 11/1940 | Schwab | 210/282 |
| 2,389,185 | 11/1945 | Dick | 210/472 |
| 2,761,833 | 9/1956 | Ward | 210/503 |
| 2,781,312 | 2/1957 | Klumb et al. | 210/282 |
| 2,869,724 | 1/1959 | McDevitt | 210/282 |
| 3,038,610 | 6/1962 | Hetherington | 210/282 |
| 3,327,859 | 6/1967 | Pall | 210/282 |
| 3,335,917 | 8/1967 | Knight | 222/189 |
| 3,782,549 | 1/1974 | Muller | 210/282 |
| 4,389,311 | 6/1983 | La Freniere | 210/282 |
| 4,695,379 | 9/1987 | Nohren, Jr. et al. | 210/282 |
| 4,714,550 | 12/1987 | Malson et al. | 210/244 |
| 4,753,728 | 6/1988 | VanderBilt et al. | 210/282 |
| 4,769,144 | 9/1988 | Nohren, Jr. | 210/282 |
| 4,800,018 | 1/1989 | Moser | 210/266 |
| 4,852,781 | 8/1989 | Shurnick et al. | 224/148 |
| 5,045,195 | 9/1991 | Spangrud et al. | 210/282 |
| 5,061,367 | 10/1991 | Hatch et al. | 210/137 |
| 5,122,272 | 6/1992 | Iana et al. | 210/473 |
| 5,126,044 | 6/1992 | Magnusson et al. | 210/282 |
| 5,167,819 | 12/1992 | Iana et al. | 210/474 |
| 5,211,973 | 5/1993 | Nohren, Jr. | 210/449 |
| 5,252,206 | 10/1993 | Gonzalez | 210/282 |
| 5,273,649 | 12/1993 | Magnusson et al. | 210/232 |
| 5,308,482 | 5/1994 | Mead | 210/207 |
| 5,431,813 | 7/1995 | Daniels | 210/282 |
| 5,509,605 | 4/1996 | Cripe | 210/266 |
| 5,545,315 | 8/1996 | Lonneman | 210/120 |

FOREIGN PATENT DOCUMENTS 402661 12/1990 European Pat. Off. .

Primary Examiner—Cynthia L. Nessler
Attorney, Agent, or Firm—Nixon & Vanderhye P.C.

[57] ABSTRACT

A liquid treatment mechanism may easily be snapped on, or otherwise attached, to the neck of the single orifice bottle, such as a standard five gallon water bottle. An end cap is connected to a first tube of the liquid treatment mechanism, the liquid treatment element (such as activated carbon) disposed in the first tube and extending from the second end of the first tube to a termination position near, but spaced from, the first end of the first tube. A liquid inlet allows for the passage of liquid from exteriorly of the first tube into contact with the liquid treatment element. A dispensing tube (which may include a cyst or other particle filter) is disposed adjacent the first end of the first tube and extends from the liquid treatment element. An air inlet (e.g., a free about 0.02–0.1 inch diameter hole) is disposed in the first tube near its first end and exteriorly of the dispensing tube. A sheath of porous material may wrap the activated carbon, which may be either in hollow tubular or block form. Non-potable water may be treated by breaking an ampoule containing about 300 mg of calcium hypochlorite which is placed into the bottle and is dissolved by the non-potable water before the first tube is inserted into the bottle, and the water dispensed through it.

17 Claims, 5 Drawing Sheets

SINGLE ORIFICE BOTTLE WATER FILTER

BACKGROUND AND SUMMARY OF THE INVENTION

The commercial market for properly-treated drinking water is increasing significantly as natural sources of water becomes polluted, and as the population develops more interest in having properly-treated drinking water.

Although there are many commercial systems for purifying drinking water, most systems require a pressurized supply of water to force the water through a filter. Some systems have a holding chamber which is filled with water which drains by gravity into a second chamber which retains the purified water, while other systems are filled slowly from a tap, the water flowing through a filter as it enters a container. Still other systems require the use of a hand pump to force water through a filter.

As an alternative to utilizing their own purifying equipment, tens of thousands of homes and businesses around the world purchase water, such as by using 5 gallon or smaller bottles as the primary supply, typically the water being dispensed using crocks or coolers. In almost all cases the bottles are purchased full of purified water and returned to the provider when empty.

According to the present invention, a liquid treatment mechanism is provided, as well as a combination thereof with a bottle and a method of treating water, which provide great versatility and which allow purified water to be simply and easily obtained and dispensed without requiring complicated pressurized prior art systems, without the need for purchasing purified water in bottles, which bottles are returned to the provider. The treatment device according to the present invention may be used with a standard water bottle, such as a five gallon standard water bottle, and can dispense water either using a crock or cooler, or using a siphoning effect. By adjusting the treatment media, almost any type of pollutant or contaminant can be removed from the water, and in fact according to the present invention it is even possible to produce safe drinking water from non-potable water.

According to one aspect of the present invention, a liquid treatment mechanism adapted for use with a single orifice bottle for treating liquid in the bottle prior to or during dispensing is provided. The mechanism comprises the following components: A substantially rigid material first tube having first and second opposite ends. An end cap, for attachment to a bottle neck, adjacent the first end of the first tube. A liquid treatment element for treating liquid passing therethrough, the liquid treatment element disposed in the first tube and extending from adjacent the second end of the first tube to a termination position near, but spaced from, the first end of the first tube, so that the first tube has a substantially open interior first end portion, and a middle and second end portion containing the liquid treatment element. Liquid inlet means for allowing passage of liquid from exteriorly of the first tube into the middle and second end portion of the first tube. A dispensing tube disposed in the first end portion and extending from the liquid treatment element substantially through the interior of the first end portion for dispensing liquid from the first tube after the liquid has passed through the liquid treatment element. And air inlet means formed in the first end portion, exteriorly of the dispensing tube, for allowing air to pass from the interior of the first end portion, but substantially precluding passage of liquid from exteriorly of the first end portion into the interior of the first end portion.

The first tube may be made of any suitable material which adequately protects the liquid treatment element during handling, and while in a bottle, if the bottle is moved around, etc. For example, it may comprise rigid acrylic tubing, or similar type substantially-rigid plastic, or glass, particularly if it is desirable to make it substantially transparent, or it can be made of thin-wall metal, or the like, if transparency is not important. The end cap desirably is a snap cap of flexible material, such as rubber, synthetic rubber, or polyethylene, and the snap cap may be welded, mechanically connected to, or adhesively connected to the first tube. The first tube typically has a length of 18 inches or less, depending upon the size of the bottle on which it is to be disposed, and is typically substantially concentric with the bottle neck. It also typically has a diameter of about 0.5–1.75 inches, e.g., about 1.5 inches; in any event, it is dimensioned to fit through a bottle neck into a bottle.

The liquid treatment element is preferably some type of configuration of activated carbon, such as a tube of porous carbon, or a block of porous carbon, or carbon powder sintered with a plastic binder or the like. Alternatively, it may comprise loose granules of activated carbon such as in a chamber between two permeable screens, e.g., tubular screens. However, the treatment element may also comprise a wide variety of other types of media such as ion exchange media-like resin beads, flat filtering membranes, fibrous filters, zeolite particles or coatings, or any of the above sintered together with carbon.

The liquid inlet means may comprise a through extending opening of any shape (e.g., a slot, circular, etc.) or number which typically would be formed either in the tube middle and second end portion, or in a second end cap at the second end of the first tube. The location of the liquid inlet must be designed with respect to the dispensing tube so that liquid must pass through the treatment element before being dispensed from the dispensing tube.

The dispensing tube may comprise a short solid wall tube having a free open end that is substantially coterminous with the first end of the first tube, or it may comprise a long, at least partly flexible, tube, having a length at least as great as the length of the first tube, so that a siphon action may be provided in order to dispense liquid through the dispensing tube. Alternatively, the dispensing tube may comprise a particle filter capable of filtering cysts out of the liquid passing therethrough. For example, one or more filtering membranes having a pore size of about 1.5–6.0 microns may be provided, capable of effectively filtering out cysts and other particles having a size of about 3–4 microns. Particle filtration may also be provided in the form of a sheath of porous material capable of removing fine particles which surrounds the activated carbon tube. Such a sheath would particularly be desirable where the first tube is transparent, and the sheath could be light in color so as to obscure the black color of the activated charcoal tube. A flexible dispensing element may also extend from the dispensing tube when it comprises a particle filter.

The air inlet means may comprise a conventional check valve, such as a duck bill valve, spring-pressed ball valve, or the like (or one or more of such check valves). However, in the preferred embodiment, a through-extending opening is provided. In order to operate most effectively, the opening should have a maximum dimension (e.g., diameter) of between about 0.02–0.1 inches, with a circular hole with a diameter of about 0.04 inches being optimum.

According to another aspect of the present invention, a bottle and treatment mechanism is provided comprising the following elements: A bottle having a neck defining the sole orifice through which liquid may flow into or out of the bottle. A liquid treatment mechanism, the liquid treatment mechanism comprising: an end cap attached to the bottle neck, adjacent the first end of the first tube; a first tube disposed within the bottle and having first and second opposite ends, the first end connected to the end cap; a liquid treatment element for treating liquid passing therethrough, the liquid treatment element disposed in the first tube and extending from adjacent the second end of the first tube to a termination position near, but spaced from, the first end of the first tube, so that the first tube has a substantially open interior first end portion, and a middle and second end portion containing the liquid treatment element; liquid inlet means for allowing passage of liquid from exteriorly of the first tube into the middle and second end portion of the first tube; and a dispensing tube disposed in the first end portion and extending from the liquid treatment element substantially through the interior of the first end portion for dispensing liquid from the first tube after the liquid has passed through the liquid treatment element. And, a vent to allow air to pass into the bottle to take the place of liquid dispensed therefrom.

The vent preferably comprises the air inlet means as described above with respect to the liquid treatment mechanism. The bottle typically comprises a standard five gallon or smaller drinking water bottle, and has water therein. Where the water is non-potable, the combination further comprises a frangible, non-permeable (e.g., glass) ampoule containing a water disinfectant (e.g., calcium hypochlorite) of sufficient amount so as to provide the equivalent of a total chlorine concentration of at least about 10 ppm when the ampoule is broken and the water disinfectant is in the bottle substantially full of non-potable water. In this situation, the dispensing tube preferably comprises a particle filter for removing cysts, and the liquid treatment element comprises a material (such as activated carbon) which removes chlorine from the water so that the dispersed water taste is appropriate for drinking purposes.

According to another aspect of the present invention, a method of treating non-potable water, to make it potable, using a standard water bottle having a neck, a tube containing a filtering media, a non-permeable frangible ampoule containing disinfectant, and a particle filter is provided. The method comprises the following steps: (a) opening the ampoule and inserting disinfectant therefrom into the bottle through the neck thereof; (b) inserting non-potable water into the bottle through the open neck thereof so that the water properly mixes with or dissolves the disinfectant; then (c) inserting the tube containing filtering media into the water bottle through the neck thereof, and connecting the tube to the neck; and then (d) dispensing the water from the water bottle so that it passes through the filtering media and the particle filter before completely exiting the bottle, so that the disinfectant and cysts are substantially removed from the water before it exits the bottle.

Typically, the ampoule contains a sufficient amount of dissolvable disinfectant to provide the equivalent of approximately 10 ppm of chlorine given the size of the bottle, and step (b) is practiced to ensure that the disinfectant is dissolved in the bottle before step (c) is practiced. Either step (a) may be practiced before step (b) or vice versa, or the water and the disinfectant may be introduced into the bottle together. Where the bottle comprises a standard five gallon water bottle, the ampoule typically will comprise a glass ampoule containing about 300 mg of calcium hypochlorite, and step (a) is then practiced to open ampoule and to pour all of the about 300 mg of calcium hypochlorite from the ampoule into the bottle.

Steps (c) and (d) may be practiced so that the water is dispensed from the bottle by siphon action, the bottle resting with the neck at the top during the practice of step (d). Alternatively, steps (c) and (d) may be practiced so that the water is dispensed from the bottle by pouring action, the bottle neck being substantially at the bottom thereof during the practice of step (d) (for example, supported by a crock or cooler).

It is the primary object of the present invention to provide for simple, effective, and versatile treatment of water to make it more suitable for drinking. These and other objects of the invention will become clear from an inspection of the detailed description of the invention and from the appended claims.

DETAILED DESCRIPTION OF THE DRAWINGS

Figure 1:
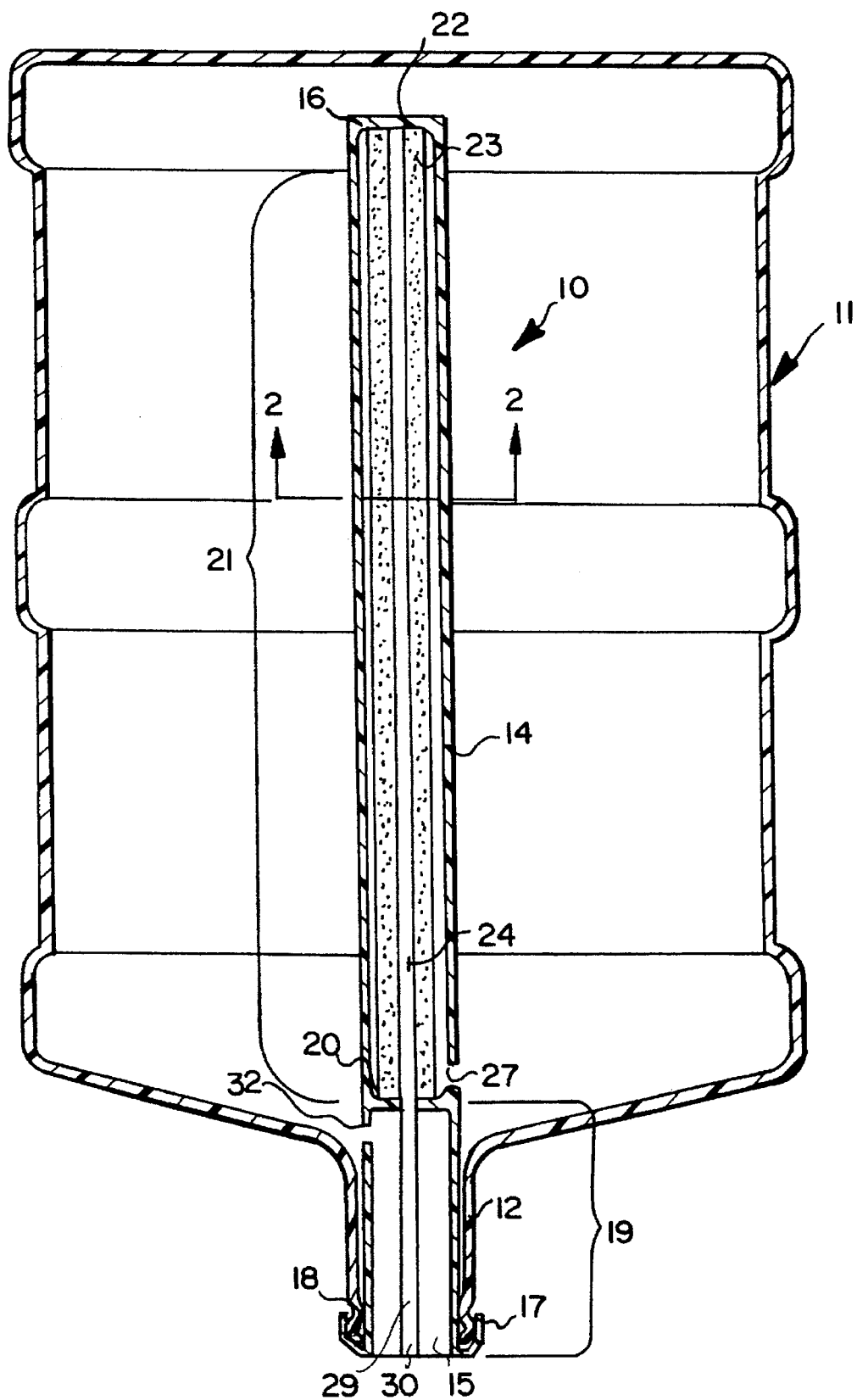
FIG. 1 is a side schematic cross-sectional view of an exemplary liquid treatment mechanism according to the present invention shown mounted in a standard five gallon water bottle, and of the type in which dispensing would take place typically through a crock or cooler.

FIG. 1 illustrates one embodiment of a liquid treatment mechanism—shown generally by reference numeral 10—according to the present invention shown in use with a standard five gallon water bottle 11 having a neck 12 as the single orifice through which liquid is dispensed from the bottle 11. The bottle 11 is typically of plastic, glass or another transparent material. The embodiment of the liquid treatment mechanism 10—as seen in FIG. 1—is for use in dispensing liquid (typically water) from the bottle 11 utilizing a crock or cooler, in which the neck 12 is at the bottom of the bottle 11 during the dispensing action.

The liquid treatment mechanism 10 includes an outer, first, tube 14 having a first end 15, and a second, opposite end, 16. The first tube 14 is preferably of substantially rigid material. Where it is desirable that the first tube 14 be substantially transparent, it is preferably made of rigid acrylic tubing, or other suitable rigid plastic, or glass. If transparency is not important, then the tube 14 may be made of a thin wall metal, ceramic, or a wide variety of other materials. "Substantially rigid" means that it should be rigid enough to effectively protect the liquid treatment element disposed therein (as will be hereinafter described), and so that regardless of the orientation of the bottle 11 it extends substantially concentrically with the neck 12 most of the way into the bottle 11. Typically, the tube 14 will have an outside diameter (circular configuration is preferred, although not essential) that is about 0.05–1.75 inches, and in any event is dimensioned to fit through the neck 12. The desirable diameter of tube 14 for use with a standard five gallon bottle 11 is about 1½ inches. The length of the first tube 14—that is, the distance between the ends 15–16 thereof—preferably 18 inches or less, depending upon the size of the bottle 11. Typically, however, it is at least six inches.

Disposed adjacent the first end 15 (e.g., at, or substantially at, the first end 15) is an end cap 17. In the embodiment actually illustrated in the drawings—as perhaps seen most clearly in FIGS. 1 and 6—the end cap 17 preferably is of a flexible material so that it can snap over the typical bottle end configuration 18 (see FIG. 1) of the bottle neck 12, and hold the mechanism 10 properly in place. For example, the end cap 17 may be made of polyethylene, synthetic or natural rubber, or another type of material that has sufficient flexibility so that it can snap over and hold onto the bottle termination 18, yet it can be removed therefrom. However, instead of a snap cap configuration, the end cap 17 may be made as a screw-on cap, with a bayonet connection, or in another suitable manner. Where the first tube 14 and the end cap 17 are of different materials, they may be connected together by welding (e.g., sonic, thermal or spin welding), or mechanically (e.g., with a screw-on or snap-on fit), or by an adhesive (e.g., an ultraviolet cured adhesive).

The hollow interior of the tube 14 is preferably divided into two parts. A first end portion of the tube—shown schematically at 19 in FIG. 1—is from an interior divider 20 to the first end 15. The middle and second portion of the tube—shown generally by reference numeral 21 in FIG. 1—is from the divider 20 to the second end 16. The first end portion 19 has a substantially open interior while the portion 21 includes a liquid treatment element 23 therein. The liquid treatment element 23 is for treating liquids passing therethrough and it is disposed preferably virtually the entire distance between the interior divider 20 and the second end 16, typically being mounted by, or abutting or connected to, a closed end cap 22 at the second end 16 of the tube 14. Both the divider 20 and the end cap 22 are made of non-permeable material, such as a solid plastic.

The divider 20 may be of a resilient material that securely engages the interior wall of tube 14 to prevent water passage past it, yet is removable to allow replacement of element 23. Where the element 23 is not replaceable, or is replaced by removing end cap 22, divider 20 may be permanently affixed to the interior wall of tube 14 (e.g., by welding or with adhesive).

The liquid treatment element 23 may comprise a wide variety of configurations and be made of a wide variety of materials. A preferred material for at least a part of the liquid treatment element 23 is activated carbon, which may be in solid—but porous—form (e.g., carbon powder sintered together with a plastic binder). Alternatively, granulated activated carbon may be provided between two permeable screens extending substantially the length of the portion 21, the screens either being in flat or cylindrical form. In the embodiment illustrated in FIGS. 1 and 2, a porous hollow tube of activated carbon is provided as the treatment element 23, a hollow interior passage 24 being provided therein, and an annular passage 25 formed between the inner wall of the first tube 14 and the outer portion of the activated carbon tube 23.

It should be understood that activated carbon is only one form that the treatment element 23 can take. Alternatively, it may comprise an ion exchange media (e.g., for lead removal), for example, in the form of resin beads, flat filtration membranes, fibrous filtration structures, zeolite particles or coatings, either by themselves or sintered together with carbon to form a permeable media; or it may comprise other conventional water treatment media, including fine particle filters, such as described in EPO 0 402 661 published Dec. 19, 1990.

Figure 6:
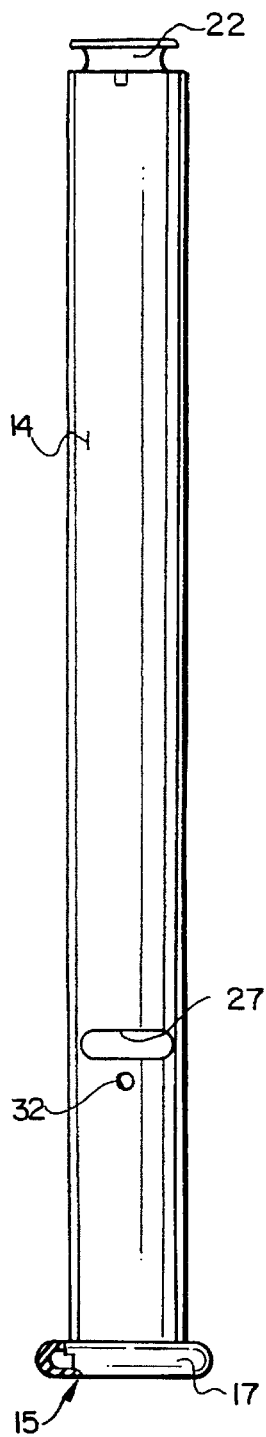
FIG. 6 is a side schematic elevational view of another liquid treatment mechanism utilizable in the combination of FIG. 1.

The liquid treatment mechanism 10 further includes liquid inlet means for allowing passage of liquid from exteriorly of the first tube 14 into the portion 21 thereof so that the liquid will pass through the treatment element 23. The liquid inlet means may comprise a wide variety of different structures in the form of valves, nozzles, orifices, passages, openings or the like. In the embodiment illustrated in FIG. 1—and as seen for a particular configuration in FIG. 6—the inlet means may comprise an opening 27 which may be circular, polygonal or—as illustrated in FIG. 6—slot-like in configuration. The liquid opening 27 but rather a number of different openings 27 may be provided, spaced circumferentially about the tube 14.

The liquid treatment mechanism 10 also includes a dispensing tube 29. The dispensing tube 29 is disposed in the portion 19 and extends from the liquid treatment element 23 substantially to or through the first end portion 19, in communication with the passageway 24, for dispensing water from the tube 14 after the water is passed through the treatment element 23. In the embodiment illustrated in FIG. 1 which is used in association with conventional crocks and coolers, the dispensing tube 29 is a simple, hollow plastic tube which may be of either rigid or flexible material and which has an end 30 through which the water is dispensed that is substantially co-terminus with the first end 15 of the first tube 14. The diameter of the dispensing tube 29 is large enough to allow substantially free flow of water therethrough, but small enough so that it is approximately the same as the passageway 24 (e.g., about one-quarter to one-tenth the diameter of the first tube 14).

The mechanism 10 also comprises an air inlet means formed in the first end portion 19 exteriorly of the dispensing tube 29 for allowing the air to pass from the interior of the first end portion 19 (that is from the ambient atmosphere through the open end 15 of the tube 14) into the interior of the water bottle 11 but substantially precluding passage of liquid from exteriorly of the first end portion 19 (that is from the interior of the bottle 11) into the interior of the first end portion 19. The air inlet means may comprise a wide variety of different types of conventional check valves, such as duck bill valves, or even spring-pressed balls or cones. However, in the preferred embodiment it is a through-extending, free opening shown generally by reference numeral 32 in FIGS. 1, 5, and 6. In order to function properly, preferably the largest dimension of opening 32 is about 0.02–0.1 inches, e.g., optimally about 0.04 inches. Preferably, it is circular in cross section, for example, being a drilled hole about 0.04 inches in diameter. It is preferably provided in the portion 19 just on the opposite side of the interior divider 20 from the portion 21. FIG. 1 shows the air inlet 32 on an opposite side of the first tube 14 from the liquid inlet 27; while FIG. 6 shows them adjacent each other on the same side, this is for convenience of illustration only and preferably openings 27, 32 are circumferentially spaced from each other. Either configuration, or other spacings, both circumferentially and axially, are suitable as long as air can seep through the opening 32 into the interior of the bottle 11 to take the place of liquid displaced/dispensed from the interior of the bottle 11, yet liquid does not flow out of opening 32.

While the air inlet means as described above is the preferred construction, some other type of vent may be provided to allow air to pass into the bottle 11 to take the place of the liquid dispensed therefrom. For example, an internal bladder can be provided in the bottle in which case the vent is formed as a simple opening in the bottom of the bottle (opposite the bladder from neck 12), or a check valve may be provided in the bottom of the bottle, etc. However, it is preferred that the mechanism 10 according to the present invention provide its own self-contained vent (e.g., the air inlet means 32) so that a completely standard bottle 11 may be utilized.

Figure 2:
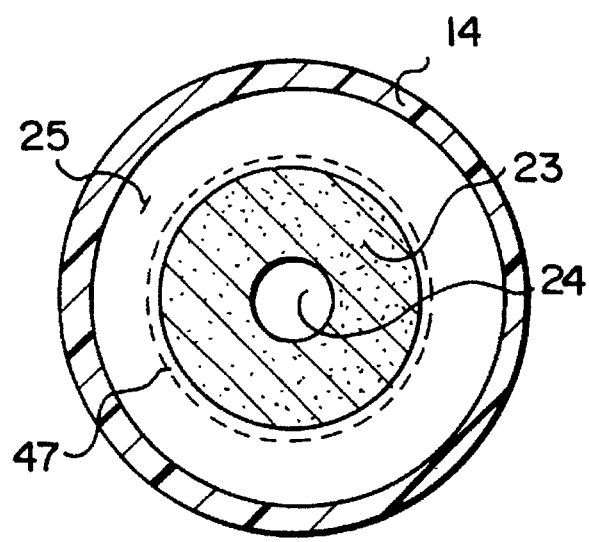
FIG. 2 is a cross-sectional view taken along lines 2—2 of FIG. 1.
Figure 4:
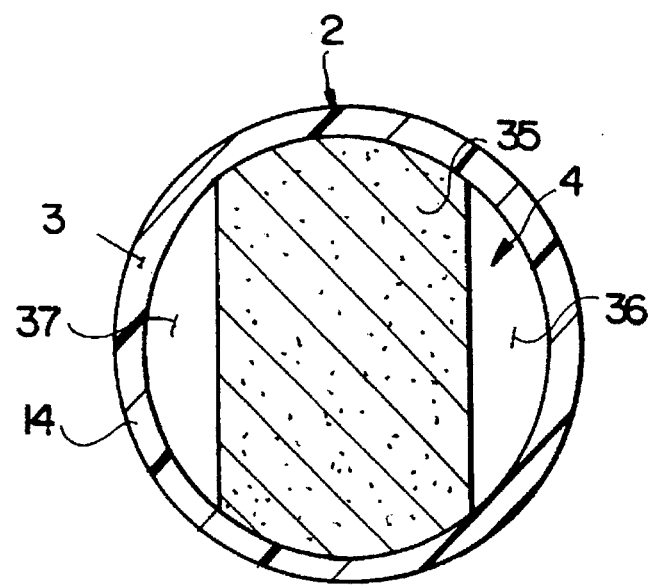
FIG. 4 is a cross-sectional view taken along lines 4—4 of FIG. 3.
Figure 3:
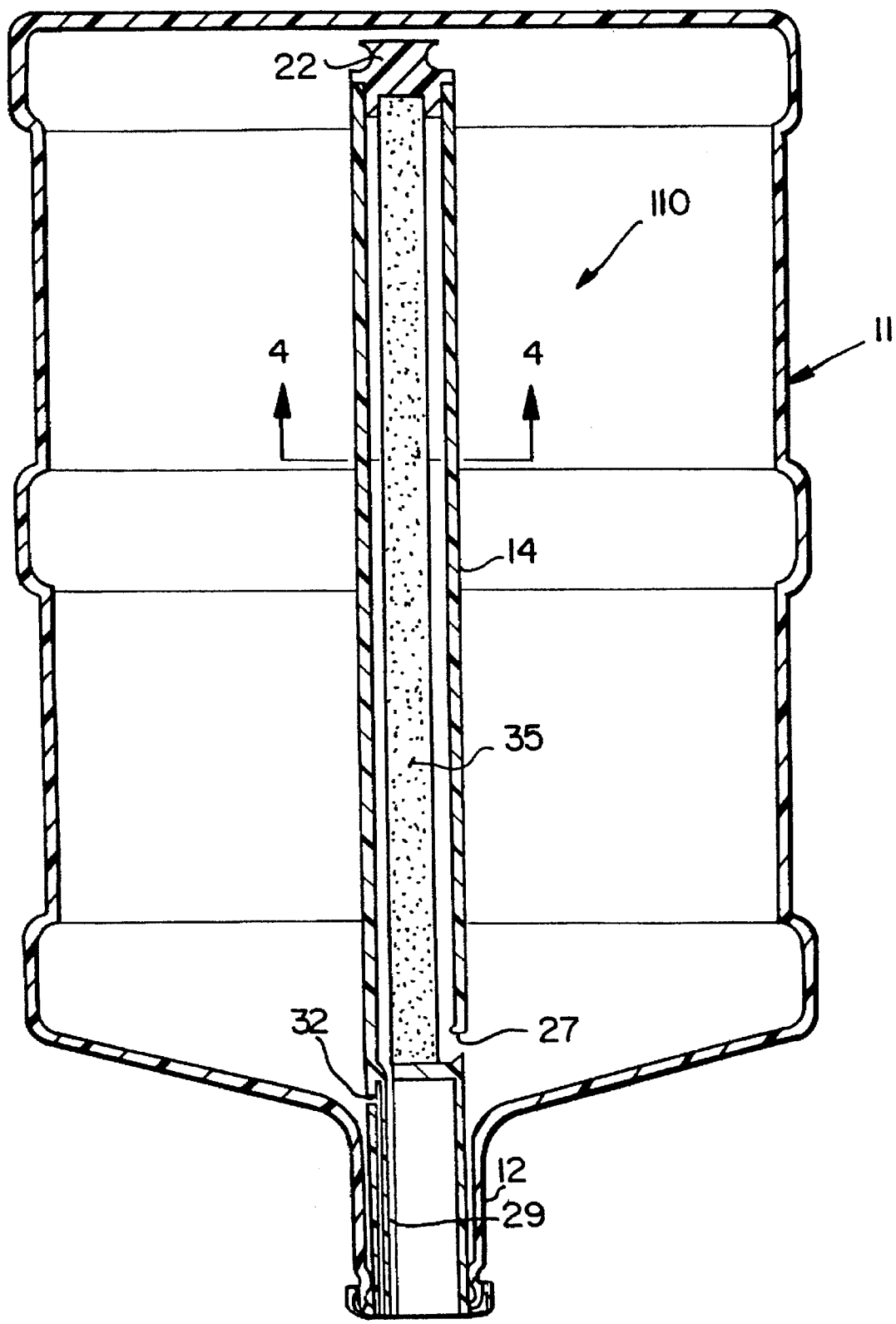
FIG. 3 is a view like that of FIG. 1 showing an alternative construction of the liquid treatment mechanism.

FIGS. 3 and 4 show a minor modification of the liquid treatment mechanism according to the present invention. In this case, the mechanism is shown by reference numeral 110, in general, but all other structures therein common with the structure 10 illustrated in FIGS. 1 and 2 are shown by the same reference numeral. The major difference between the embodiments of FIGS. 3 and 4 and the embodiments of FIGS. 1 and 2 is the configuration of the liquid treatment element, and the modification that that requires in the positioning of the dispensing tube 29. In the embodiment of FIGS. 3 and 4, the liquid treatment element comprises an activated carbon block 35, which is porous and may either be activated carbon granules between two flat screens, or carbon powder sintered with a plastic binder, or like standard configuration, which is solid yet porous. In this case, there is an inlet passage 36 for water to be treated which communicates with the inlet passage 27 on one side of the block 35, and an outlet passage 37 which communicates with the liquid dispensing tube 29 on the opposite side of the block 35.

Figure 5:
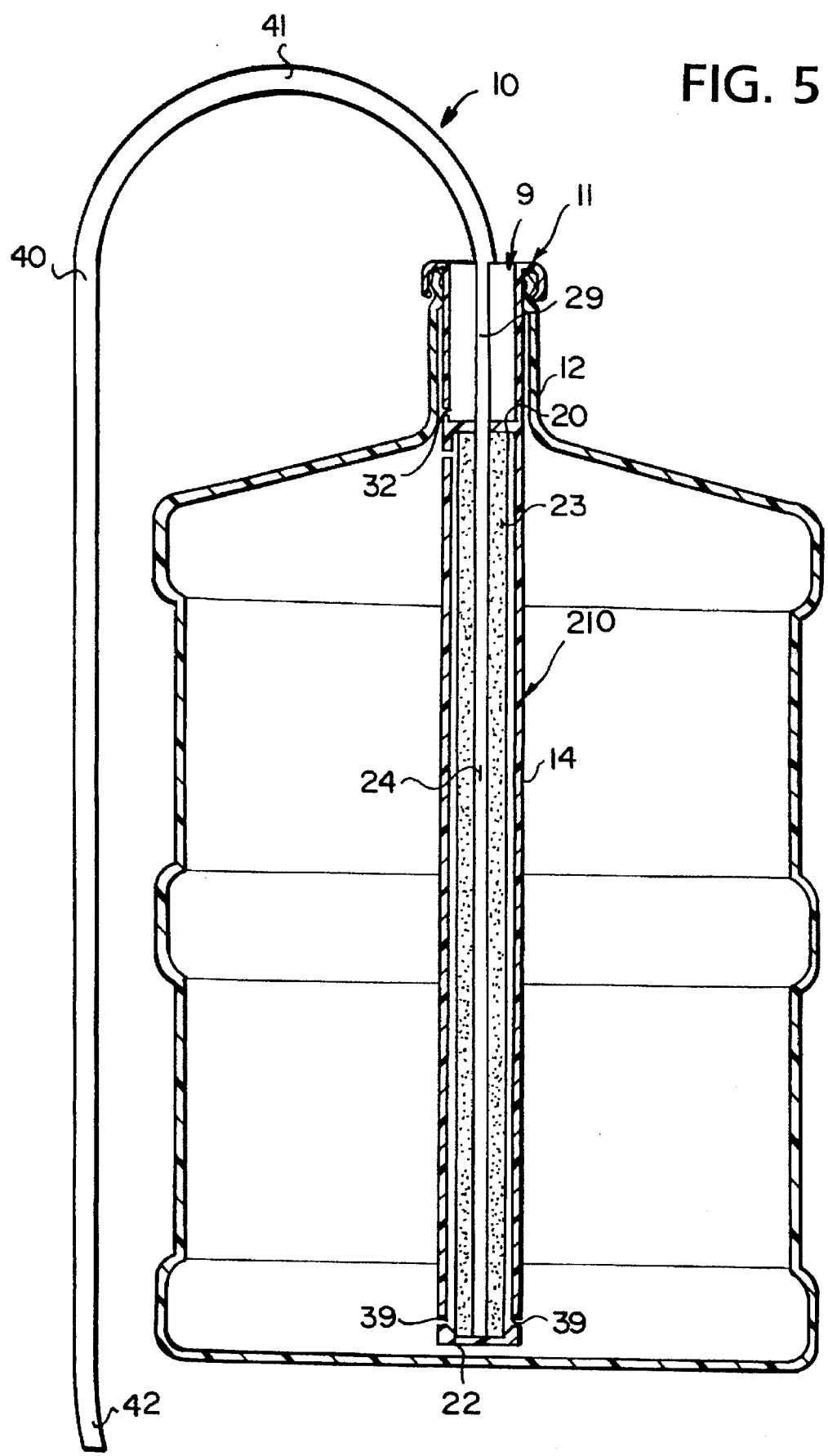
FIG. 5 is a view like that of FIG. 1 only showing another modification of the liquid treatment mechanism according to the invention, which dispenses by siphon action.

FIG. 5 illustrates another embodiment according to the present invention. In this embodiment the liquid treatment mechanism is shown generally by reference numeral 210. All of the components thereof comparable to those in the FIGS. 1 and 2 embodiment are shown by the same reference numerals.

The major difference between the mechanism 210 and the mechanism 10 is the location of the liquid inlet means, and the configuration of the dispensing tube 29. The embodiment of FIG. 5 is designed to be used with the bottle 11—as shown in FIG. 5—upright with the neck 12 at the top, some sort of a siphon action being provided to effect dispensing. For this reason, the liquid inlet means comprises one or more openings (or other structures as described with respect to the FIG. 1 embodiment) 39 which are located adjacent the second end cap 22. Of course, instead of the tubular filter/ liquid treatment element 23, a block configuration such as shown at 35 in FIGS. 3 and 4 could be utilized, in which case the inlet means 39 would be on only one side of the tube 14 and the dispensing tube 29 would be located on the opposite side thereof.

In the FIG. 5 embodiment, either as part of the dispensing tube 29, or—as actually illustrated in FIG. 5—an extension of the dispensing tube 29, is a dispensing tube portion 40 which is at least as long as the tube 14, having at least a part 41 thereof which is flexible, so that a siphoning action may be used to dispense liquid from the dispensing tube portion 40. Preferably the entire portion 40 is of flexible plastic tubing so that it can be moved as desired, to either dispense liquid, or to move the free end 42 thereof about the level of liquid within the bottle 11 so that there is no dispensing, including even wrapping portion 40 around the bottle 11 or the neck 12.

Figure 7:
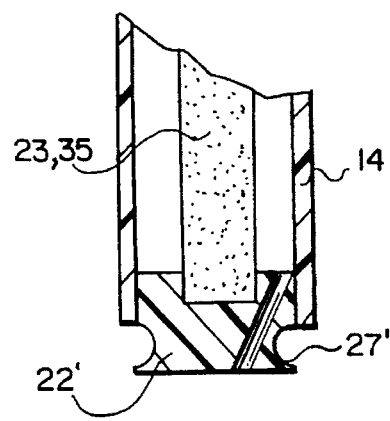
FIG. 7 is a partial side cross-sectional view of a modification of the liquid treatment mechanism embodiment illustrated in FIG. 3.

FIG. 7 illustrates a minor modification that may be provided for the inlet means for either the tubular liquid treatment element 23 or solid liquid treatment element 35 embodiments. In the embodiment illustrated in FIG. 7, the end cap, illustrated by reference numeral 22' and similar to the end cap 22 of the other embodiments, includes an inlet opening or openings 27' therein. This embodiment is useful only where a siphon dispensing action is utilized, as illustrated in FIG. 5, or the opening 27' would have to be closable (and another readily opened opening 27 be provided) to use the embodiment of FIG. 7 in the FIGS. 1 or 3 constructions.

Figure 8:
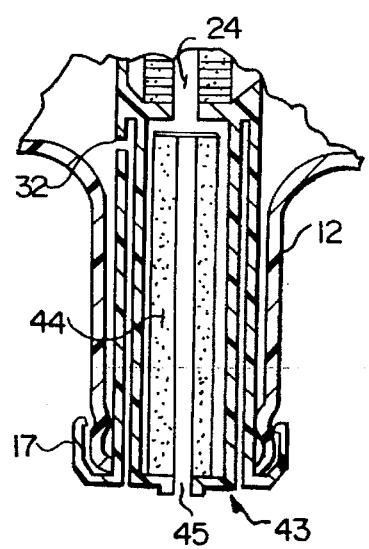
FIG. 8 is a side detail cross-sectional view of liquid treatment mechanism/bottle combination of FIG. 1 showing a modified form of dispensing tube.

FIG. 8 illustrates another construction that the dispensing tube might take. In FIG. 8 all structures comparable to those in FIG. 1 are shown by the same reference numeral. In this embodiment the dispensing tube—instead of being a simple open passage tube 29—comprises a particle filter element, shown generally by reference numeral 43. The particle filter element 43 includes particle filter media 44 therein through which water must pass from passageway 24 in order to be dispensed through the end opening 45 therein. Particle filtration media 25 is for filtering out cryptosporidium cysts or other cysts of similar size, or like particles. For example, the media 44 may comprise one or more membranes of non-woven fine plastic fibers having a pore size that is between about 1.5–6.0 microns, and effective to remove substantially all (e.g., for example, up to 99.999%) of particles in the 3–4 micron range.

As an alternative to the particle filter 43, or in addition thereto, particle filtration can also be provided by utilizing a sheath of membrane material, such as shown in dotted line at 47 in FIG. 2. The membrane material making up the sheath 47 may be a single or multiple membrane sheet for filtering out fine particles to reduce turbidity, or even possibly to remove cysts, wrapped around the outside of the tubular activated carbon element 23. Where the first tube 14 is transparent and activated carbon is used as the material for the element 23, the black color of the activated carbon may be aesthetically undesirable. In this case, the sheath 47 may also perform an aesthetic function. For example, a sheath 47 may be of white or another light color, and when wrapped around the black element 23 obscures it so that the black color is not visible from outside the bottle 11. The membrane 47 ends, once wrapped around the element 23, may be held together in any suitable manner such as by welding (e.g., sonic welding), stitching, adhesive, etc.

The following are typical method steps for utilization of the liquid treatment mechanisms according to the present invention, the following steps 1(a) and 1(b) are alternatives. In this description the liquid treatment element 23 is assessed to be a filter (e.g., activated carbon). Step 1(a) relates to either a radial or transverse flow type with a solid porous filter, while step 1(b) relates to a transverse flow type with granular loose fill media. Steps 3(a) and 4(a) relate to a crock or cooler type dispensing such as illustrated in FIGS. 1 to 3, while steps 3(b) and 4(b) relate to a siphon type such as illustrated in FIG. 5:

1a. Remove the insert 20, 29 from the mechanism 10, 110 by grasping and pulling out the insert by the small tube 29. If there is a used filter cartridge 23, 35 in the mechanism 10, remove it by pointing the open end 15 of the filter down and shaking it until the filter cartridge 23, 35 drops out. Remove a new filter element cartridge 23, 35 from its packaging and put it into the main filter tube 14. Put the insert back 20, 29 into the mechanism 10, 110 and press it in firmly so it holds the filter cartridge 23, 35 in place.

1b. Remove the plug 22 from the end 16 of the mechanism 10, 110. Pour out the granular media or remove the bag of granular media through end 16. Pour in replacement granular media or put in a replacement bag of granular media, through end 16, and replace the plug 22.

2. Fill the bottle 11 with potable water to be filtered.

3a. Insert the mechanism 10, 110 into the bottle 11. There will be some water overflow as the filter is inserted. When the filter is inserted far enough so that water can enter the water inlet opening 27, insert it the rest of the way slowly so that the mechanism 10, 110 can fill with water. Then press the mechanism 10, 110 firmly into the bottle so that the snap cap 17 seals it in place on neck 12.

3b. Slowly insert the mechanism 210 into the water bottle 11 and press it firmly so that the snap cap 17 seals it in place. If used in a five gallon bucket or other container insert the mechanism 10 so it is substantially immersed in the water and the water inlet 39 is near the bottom of the container. The Water is drawn out through the flexible tube 40 which should be substantially out of the water.

4a. Invert the bottle 11 into the crock or cooler (see FIGS. 1 and 3) with which it will be used. Filtered water will then begin draining from the bottle 11 into the crock or cooler.

4b. If using a pump which does not need to be primed, go to step 5. If using a pump which must be primed or no pump at all, move the end 42 of the flexible tube 40 to below the bottom of the bottle 11 then briefly invert the bottle 11 then return it to the upright position after the pump is primed or water begins flowing out of the end 42 of the flexible tube 40. When removing water by siphoning through the flexible tube 40, the end 42 of the flexible tube 40 must be below the bottom of the five gallon bottle 11 to start and it must remain below the level of water in the bottle 11. If the mechanism 210 is used with a bucket or other container which cannot be inverted, then start the siphon by creating a temporary vacuum on the end of the tube.

5. Consume water from the bottle 11 or other container until the bottle 11 is substantially empty, then remove the mechanism 10, 110, 210 from the bottle and return to step 2.

6. At specified regular intervals replace the filter cartridge 23, 35 while the filter is out of the bottle or other container. To replace the filter cartridge, return to step 1.

If the mechanism 10, 110, 210 is used to filter non-potable water, then the disinfectant system/method disclosed below must be used.

Figure 9:
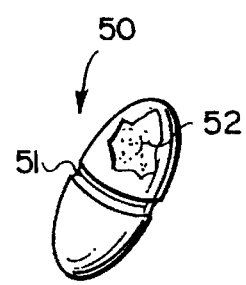
FIG. 9 is a schematic perspective view, with portions of the ampoule cut away to illustrate the interior thereof, of an ampoule filled with disinfectant that may be utilized with the combinations of FIGS. 1, 3, 5, and in particular for the treatment of non-potable water.

The disinfectant procedure is preferably practiced utilizing the ampoule 50 illustrated in FIG. 9. For example, the ampoule 50 may be a glass or other transparent, non-permeable, frangible material, for example, with a score line 51 therein providing for easy frangibility. The ampoule 50 contains at least one dose of disinfectant for treating an entire bottle 11 of non-potable water, and preferably contains essentially exactly one dose. The disinfectant is shown schematically in powder form 52 in FIG. 9. One particularly desirable disinfectant 52—although a wide variety of disinfectants may be utilized—comprises calcium hypochlorite in granular or powder form. For example, for treating about five gallons of non-potable water, such as in a standard five gallon water bottle 11, about 300 mg. of calcium hypochlorite 52 is provided in the ampoule 50 which—when emptied into the bottle 11—is effective to provide about 10 parts per million (ppm) or more dissolved chlorine. This is a sufficiently-high chlorine concentration to disinfect the water, however, it provides such a strong chlorine taste that the water may be unpalatable. For this reason, it is desirable to use one or both of the particle filter element 43 or the particle filtering membrane 47 to remove cysts and the like, and to use at least some activated carbon as the filtering element 23, 35 which removes undesirable taste elements including the chlorine.

In a typical manner of utilization of the system heretofore described to make a dispensed drinkable water from non-potable water, the ampoule 50 is broken along the score line 51 and the solid powder or granular material 52 is emptied into the bottle 11 through the neck 12. Either before, after, or while the material 52 is placed in the bottle 11, the bottle 11 is substantially filled with non-potable water through the neck 12, as with a funnel, hose, pitcher, or the like. Once the water properly mixes with the dissolved disinfectant 52, the liquid treatment/filter mechanism 10, 110, 210 is inserted into place as earlier described, and water is dispensed. For example, in the FIG. 1 embodiment, the water flows through the inlet opening 27 to fill the annular passage 25, passes through the filter element 23 (and the particle filtering membrane 47 if present) so that disinfectant filtered water enters the passageway 24, and then the water flows through the passageway 24 and enters the dispensing tube 29 or the particle filter/dispensing tube 43, ready to be consumed.

It will thus be seen that according to the present invention a simple, versatile, yet effective liquid treatment mechanism adapted to be used with a single orifice bottle is provided, as well as a bottle and treatment mechanism combination, and a method of treating non-potable water to make it potable. While the invention has been herein shown and described in what is presently conceived to be the most practical and preferred embodiment thereof, it will be apparent to those of ordinary skill in the art that many modifications may be made within the scope of the invention, which scope is to be accorded the broadest interpretation of the appended claims so as to encompass all equivalent structures, mechanisms, systems, combinations and methods.

What is claimed is:

1. A liquid treatment mechanism adapted for use with a single orifice bottle for treating the liquid in the bottle prior to or during dispensing, comprising:

a substantially rigid material first tube having first and second opposite ends;

an end cap, for attachment to a bottle neck, adjacent said first end of said first tube;

a liquid treatment element for treating liquid passing therethrough, said liquid treatment element disposed in said first tube and extending from adjacent said second end of said first tube to a termination position near, but spaced from, said first end of said first tube, so that said first tube has a substantially open interior first end portion, and a middle and second end portion containing said liquid treatment element;

liquid inlet means for allowing passage of liquid from exteriorly of said first tube into said middle and second end portion of said first tube;

a dispensing tube disposed in said first end portion and extending from said liquid treatment element substantially through said interior of said first end portion for dispensing liquid from said first tube after the liquid has passed through said liquid treatment element;

air inlet means formed in said first end portion, exteriorly of said dispensing tube, for allowing air to pass from said interior of said first end portion, but substantially precluding passage of liquid from exteriorly of said first end portion into said interior of said first end portion; and wherein said liquid treatment element comprises a hollow tube containing activated carbon.

2. A liquid treatment mechanism as recited in claim 1 wherein said first tube has a length from said first to said second end thereof; and wherein said dispensing tube comprises a tube at least partly of flexible material that extends outwardly from said first end of said first tube a distance at least as great as the length of said first tube.

3. A liquid treatment mechanism as recited in claim 1 wherein said air inlet means comprises at least one through-extending free opening in said first end portion having a maximum dimension of between about 0.02–0.1 inches.

4. A liquid treatment mechanism as recited in claim 1 wherein said liquid treatment element further comprises ion exchange media in the form of: resin beads; flat filtration membranes; fibrous filters; or zeolite particles or coatings; or resin beads, flat filtration membranes, fibrous filters, or zeolite particles, sintered together with activated carbon.

5. A liquid treatment mechanism as recited in claim 1 wherein said dispensing tube does not extend significantly past said first end of said first tube; and wherein said first tube has an outside diameter of between about 0.5–1.75 inches, and is dimensioned to fit through a bottle neck into a bottle.

6. A liquid treatment mechanism as recited in claim 5 wherein said first tube comprises an interior divider which divides said first tube interior into said first end portion and said middle and second end portion; and wherein said liquid inlet means comprises at least one opening formed in said first tube middle and second end portion adjacent said interior divider.

7. A liquid treatment mechanism as recited in claim 1 wherein said dispensing tube comprises a radial flow particle filter capable of filtering cysts out of liquid passing therethrough.

8. A liquid treatment mechanism as recited in claim 7 wherein said particle filter comprises one or more filtering membranes having a pore size of about 1.5–6.0 microns and capable of effectively filtering out cysts and other particles having a size of about 3–4 microns.

9. A liquid treatment mechanism as recited in claim 1 further comprising a sheath of porous material capable of removing fine particles from liquid, said sheath surrounding said activated carbon tube.

10. A liquid treatment mechanism as recited in claim 9 wherein said first tube is substantially transparent, and wherein said sheath is light colored, obscuring the black color of said activated carbon tube.

11. An unpressurized bottle and treatment apparatus, comprising:

a bottle having a neck defining the sole orifice through which liquid may flow into or out of the bottle;

a liquid treatment mechanism having an axial dimension and a radial dimension, said liquid treatment mechanism comprising: an end cap attached to said bottle neck; a first tube disposed within said bottle and having first and second opposite ends spaced from each other in said axial dimension, said end cap being disposed adjacent said first end of said first tube; a liquid treatment element for treating liquid passing therethrough, said liquid treatment element disposed in said first tube and extending from adjacent said second end of said first tube to a termination position near, but spaced from, said first end of said first tube, so that said first tube has a substantially open interior first end portion, and a middle and second end portion containing said liquid treatment element, said liquid treatment element dividing said middle and second end portion into first and second radially spaced chambers, liquid radially flowing through said treatment element from said first chamber to said second chamber; liquid inlet means for allowing passage of liquid from exteriorly of said first tube into said middle and second end portion of said first tube; and a dispensing tube disposed in said first end portion and extending from said liquid treatment element substantially through said interior of said first end portion for dispensing liquid from said first tube second chamber after the liquid has passed through said liquid treatment element; and a vent to allow air to pass into the bottle to take the place of liquid dispensed therefrom.

12. A bottle and treatment apparatus as recited in claim 11 wherein said vent comprises an air inlet means formed in said first end portion, exteriorly of said dispensing tube, for allowing air but not water passage therethrough.

13. A bottle and treatment apparatus as recited in claim 11 wherein said bottle comprises a standard five gallon or smaller drinking water bottle, said bottle having water therein, and wherein said bottle is inverted, with said neck substantially the lowest point of said bottle.

14. A bottle and treatment apparatus as recited in claim 13 wherein the water is non-potable water; and wherein said apparatus further comprises, a frangible non-permeable ampoule containing a water disinfectant of sufficient amount so as to provide the equivalent of a total chlorine concentration of at least about 10 ppm when said ampoule is broken, wherein the water disinfectant is provided in said bottle substantially full of non-potable water; and wherein said dispensing tube comprises a particle filter, and wherein said liquid treatment element comprises a material for removing chlorine from water.

15. A liquid treatment mechanism adapted for use with a single orifice bottle for treating the liquid in the bottle prior to or during dispensing, comprising:

a substantially rigid material first tube having first and second opposite ends;

an end cap, for attachment to a bottle neck, adjacent said first end of said first tube;

a liquid treatment element for treating liquid passing therethrough, said liquid treatment element disposed in said first tube and extending from adjacent said second end of said first tube to a termination position near, but spaced from, said first end of said first tube, so that said first tube has a substantially open interior first end portion, and a middle and second end portion containing said liquid treatment element;

liquid inlet means for allowing passage of liquid from exteriorly of said first tube into said middle and second end portion of said first tube;

a dispensing tube disposed in said first end portion and extending from said liquid treatment element substantially through said interior of said first end portion for dispensing liquid from said first tube after the liquid has passed through said liquid treatment element;

air inlet means formed in said first end portion, exteriorly of said dispensing tube, for allowing air to pass from said interior of said first end portion, but substantially precluding passage of liquid from exteriorly of said first end portion into said interior of said first end portion; and wherein said liquid treatment element divides said middle and second end portion into first and second radially spaced chambers so that liquid must flow radially through said treatment element from said first to said second chamber.

16. A liquid treatment mechanism as recited in claim 15 wherein said liquid treatment element comprises a hollow tube, said second chamber comprising the hollow interior, said first chamber comprising an annular chamber between said first tube and said liquid treatment element.

17. A liquid treatment mechanism as recited in claim 15 wherein said liquid treatment element comprises a liquid-porous solid block substantially concentric with said first tube, said first and second chambers on opposite sides of said block.

* * * * *